(12) United States Patent
Kojima

(10) Patent No.: US 12,282,033 B2
(45) Date of Patent: Apr. 22, 2025

(54) ANALYSIS DEVICE

(71) Applicant: Shimadzu Corporation, Kyoto (JP)

(72) Inventor: Masahiro Kojima, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 249 days.

(21) Appl. No.: 17/922,429

(22) PCT Filed: Apr. 12, 2021

(86) PCT No.: PCT/JP2021/015119
§ 371 (c)(1),
(2) Date: Oct. 31, 2022

(87) PCT Pub. No.: WO2021/220780
PCT Pub. Date: Nov. 4, 2021

(65) Prior Publication Data
US 2023/0176083 A1   Jun. 8, 2023

(30) Foreign Application Priority Data
Apr. 30, 2020 (JP) ................................ 2020-080476

(51) Int. Cl.
*G01N 35/00* (2006.01)
(52) U.S. Cl.
CPC . *G01N 35/00623* (2013.01); *G01N 35/00613* (2013.01)
(58) Field of Classification Search
CPC ....... G01N 35/00623; G01N 35/00613; G01N 2035/00643; H02P 8/38
See application file for complete search history.

(56) References Cited

U.S. PATENT DOCUMENTS

2002/0039012 A1 * 4/2002 Matsuda .................. H02P 8/34
                                                              318/696
2009/0315503 A1 * 12/2009 Yoshihisa .............. H04N 1/047
                                                              318/685

FOREIGN PATENT DOCUMENTS

| JP | 2949722 B2 | 9/1999 |
|----|------------|--------|
| JP | H11306701 A | 11/1999 |
| JP | 2002-064996 A | 2/2002 |
| JP | 2005-192268 A | 7/2005 |
| JP | 2009-41187 | 2/2009 |
| JP | 2009-273334 | 5/2011 |
| JP | 2012-251800 A | 12/2012 |
| JP | 2018-138869 A | 9/2018 |
| JP | 2018-149605 A | 9/2018 |

OTHER PUBLICATIONS

PCT Written Opinion of the International Searching Authority (Form PCT/ISA/237) dated May 11, 2021, for PCT application No. PCT/JP2021/015119, submitted with a partial translation.
Office Action for corresponding application No. 202180031631.8, dated Oct. 9, 2024.

* cited by examiner

*Primary Examiner* — Paul M. West
(74) *Attorney, Agent, or Firm* — Muir Patent Law, PLLC

(57) ABSTRACT

Provided is an analysis device capable of reducing vibration and noise generated by a stepping motor due to countermeasure for step-out of the stepping motor. A drive unit is controlled such that a set value of driving torque of the stepping motor increases stepwise in a plurality of steps each time the step-out of the stepping motor is detected by the step-out detection unit.

7 Claims, 5 Drawing Sheets

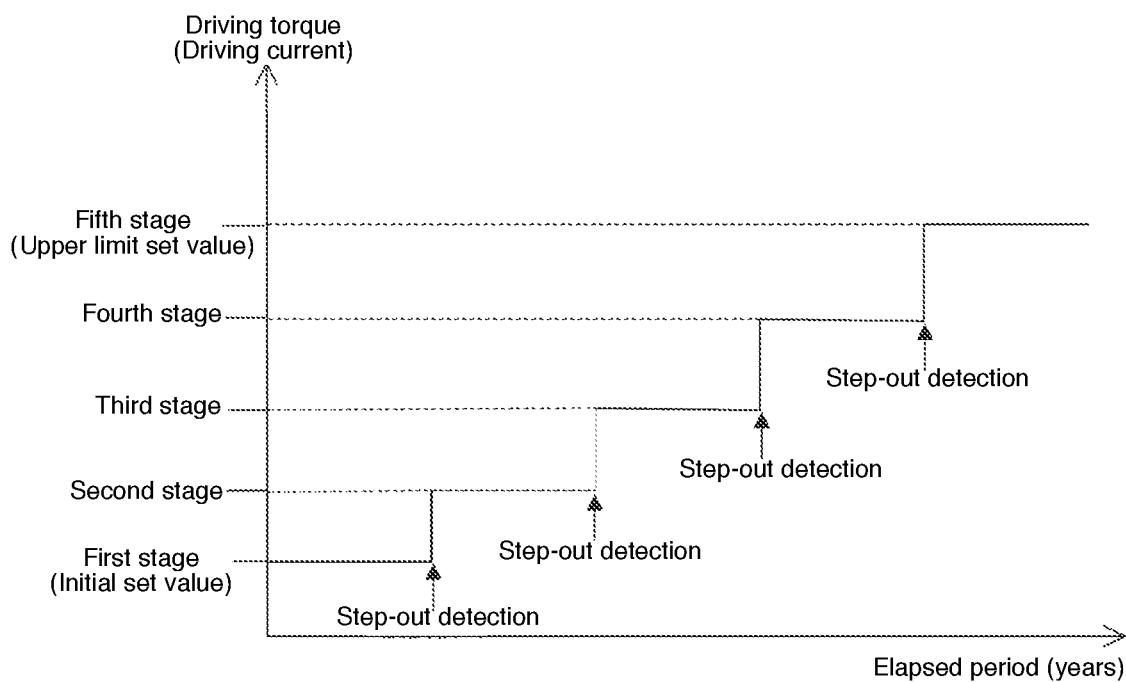

FIG.4

Table of driving torque set values

| Driving torque set value stage | Driving current set value | Driving torque set value |
|---|---|---|
| First stage | First driving current set value | First driving torque set value |
| Second stage | Second driving current set value | Second driving torque set value |
| Third stage | Third driving current set value | Third driving torque set value |
| Fourth stage | Fourth driving current set value | Fourth driving torque set value |
| Fifth stage | Fifth driving current set value | Fifth driving torque set value |

ANALYSIS DEVICE

TECHNICAL FIELD

The present invention relates to an analysis device.

BACKGROUND ART

For example, in an analysis device, such as, e.g., a gas chromatograph, for analyzing a sample, a stepping motor is provided to an auto-injector, etc., for driving a mechanical unit for automatically analyzing a sample. Such a stepping motor is driven by a drive unit by driving torque required to operate the mechanical unit stably.

Conventionally, a stepping motor is generally designed to be operated by driving torque significantly greater than the minimum required driving torque that does not cause step-out for a long period. Such a design is made by considering, e.g., an increasing tendency of the future movement difficulty of the motor due to the individual difference and aging of the stepping motor itself and configuration parts in the analysis device, such as, e.g., parts of the mechanical unit.

Further, in order to cope with step-out of a stepping motor, it is known to perform control as follows. That is, when it is determined that a stepping motor is about to step out, the rotational speed of the stepping motor is reduced. With this, the driving torque is increased to meet the load to prevent possible step-out (see Patent Document 1).

PRIOR ART DOCUMENT

Patent Document

Patent Document 1: Japanese Unexamined Patent Application Publication No. 2002-064996

SUMMARY OF THE INVENTION

Problems to be Solved by the Invention

However, in the case of controlling the driving of the stepping motor by the driving torque set according to a conventional general design, the driving torque is increased more than required for the purpose of preventing step-out. Therefore, in a stepping motor, adverse effects, such as, e.g., increased vibration and noise, occur.

Further, in the control method of a stepping motor as described in Patent Document 1, the driving torque is increased by decreasing the rotational speed of the stepping motor to avoid step-out. In this case, the performance of the analysis device provided with the stepping motor deteriorates due to the decreased rotational speed.

It is an object of the present invention to provide an analysis device capable of reducing vibration and noise generated from a stepping motor due to the step-out countermeasure thereof.

Means for Solving the Problem

According to one aspect of the present disclosure, an analysis device includes:
- a stepping motor configured to drive a mechanical unit for analyzing a sample;
- a drive unit configured to drive the stepping motor by set driving torque;
- a control unit configured to control the drive unit; and
- a detection unit capable of detecting step-out of the stepping motor, wherein the control unit controls the drive unit such that a set value of the driving torque of the stepping motor increases stepwise each time the step-out of the stepping motor is detected by the detection unit.

The analysis device may be configured such that the control unit increases the set value of the driving torque of the stepping motor stepwise by repeatedly increasing the set value a plurality of times between an initial set value and an upper limit set value each time the step-out of the stepping motor is detected by the detection unit.

It may be configured such that the analysis device further includes:
- a prescribed notification unit, wherein the control unit makes the prescribed notification unit execute a prescribed notification in response to a detection of the step-out of the stepping motor by the detection unit in a state in which the set value of the driving torque of the stepping motor has reached an upper limit set value.

It may be configured such that the analysis device further includes:
- a specific notification unit, wherein the control unit makes the specific notification unit notify a remaining number of times to increase the set value of the driving torque each time the step-out of the stepping motor is detected by the detection unit.

It may be configured such that in the analysis device, the control unit performs control to increase the set value of the driving torque stepwise by increasing a set value of a driving current stepwise.

Effects of the Invention

According to the present invention, it is possible to provide an analysis device capable of reducing vibration and noise generated from a stepping motor due to a countermeasure against step-out of the stepping motor.

BRIEF DESCRIPTION OF THE DRAWINGS

FIG. 3 is a timing chart showing a stepwise setting change example of the driving torque in the step-out countermeasure control.

FIG. 4 is a diagram showing a table example of driving torque set values used in the step-out countermeasure control in a tabular format.

EMBODIMENTS FOR CARRYING OUT THE INVENTION

Hereinafter, an embodiment will be described with reference to the attached drawings.

Configuration Example of Analysis Device

Figure 1:
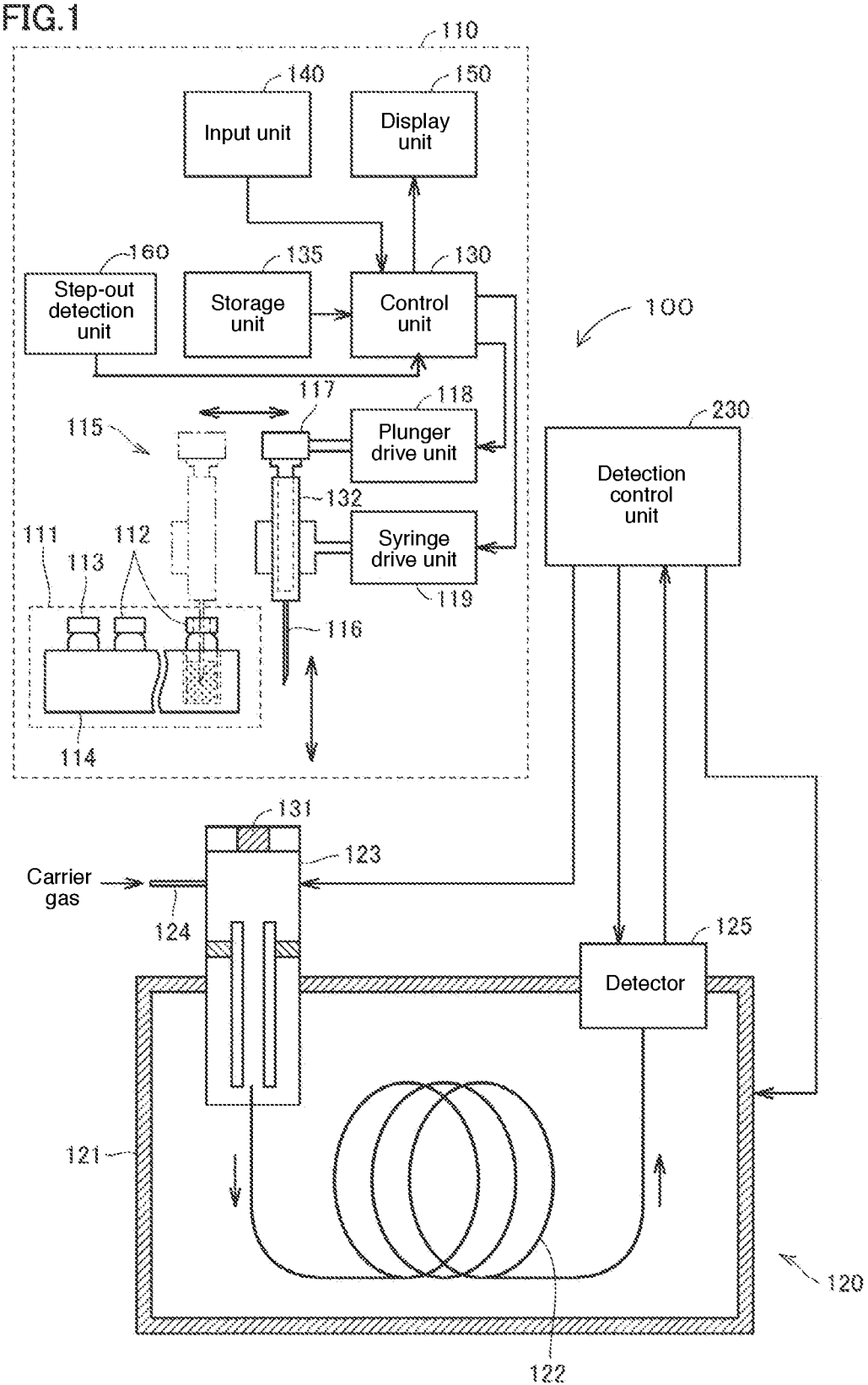
FIG. 1 is a diagram illustrating a configuration of an analysis device.

FIG. 1 is a diagram illustrating a configuration of an analysis device 100 used for analyzing a sample. The analysis device 100 is provided with an automatic sample injection unit 110, a gas chromatograph unit 120, and a detection control unit 230.

The automatic sample injection unit 110 is provided with a vial rack housing 111, a syringe 115, a syringe drive unit 119, a plunger drive unit 118, a control unit 130, a storage unit 135, an input unit 140, a display unit 150, and a step-out detection unit 160.

The syringe 115 includes a barrel 132 provided with a needle 116 at its distal end and a plunger 117 slidably inserted into the barrel 132. A plurality of sample vials 112 and a cleaning vial 113 are disposed in the vial rack of the vial rack housing 111. An analysis target sample is encapsulated in the sample vial 112. A cleaning liquid for cleaning the syringe 115 is encapsulated in the cleaning vial 113.

The syringe drive unit 119 inserts the needle 116 into the sample vial 112 or the cleaning vial 113 by moving the entire syringe 115 in the vertical direction and in the horizontal direction or pulls the needle 116 out of the sample vial 112 or the cleaning vial 113. The syringe drive unit 119 inserts the needle 116 into the sample vaporization chamber 123 by moving the entire syringe 115 downward. The syringe drive unit 119 is provided with a drive source, such as, e.g., a stepping motor (see FIG. 2).

The plunger drive unit 118 moves the plunger 117 in the vertical direction to inject a sample or a cleaning liquid into the barrel 132. The plunger drive unit 118 moves the plunger 117 downward to inject the sample in the barrel 132 into the sample vaporization chamber 123. The plunger drive unit 118 is provided with a drive source, such as, e.g., a stepping motor (see FIG. 2).

The syringe 115 and the plunger 117 correspond to a mechanical unit for analyzing a sample.

The gas chromatograph unit 120 is provided with a temperature controllable column oven 121, a capillary column 122 arranged in the column oven 121, a sample vaporization chamber 123 arranged at the inlet of the capillary column 122, and a detector 125 arranged at the outlet of the capillary column 122.

To the sample vaporization chamber 123, a carrier gas supply pipe 124 for introducing a carrier gas is connected. Through the carrier gas supply pipe 124, a carrier gas adjusted to a substantially constant flow rate is supplied to the sample vaporization chamber 123. A septum 131 into which the needle 116 is inserted is arranged at the upper portion of the sample vaporization chamber 123. The carrier gas and the sample are introduced into the capillary column 122 through the sample vaporization chamber 123.

The detector 125 detects various components separated in the capillary column 122. The storage unit 135 stores a speedy table. The control unit 130 is provided with a CPU (Central Processing Unit) 2, a ROM (Read Only Memory), and a RAM (Random Access Memory). The CPU reads out the control program stored in the ROM to the RAM and executes the program. Based on the speed table stored in the ROM, the CPU controls the driving of the syringe drive unit 119 and the driving of the plunger drive unit 118.

The detection control unit 230 is provided with a CPU, a ROM, and a RAM. The CPU reads out the control program stored in the ROM to the RAM and executes the program. With this, the temperature of the sample vaporization chamber 123 and that of column oven 121 are controlled, and data processing of the detection results of the detector 125 is executed.

The input unit 140 accepts various instructions and conditional settings from a user. The input unit 140 is composed of a keyboard, a mouse, etc., connected to a personal computer. The display unit 150 displays the results of the data processing outputted from the control unit 130.

Example of Step-out Countermeasure Control

Next, step-out countermeasure control in the analysis device 100 will be described. In this step-out control, when the stepping motor provided in each of the plunger drive unit 118 and the syringe drive unit 119 is stepped out, the set value of the driving torque of the stepping motor is controlled to be increased stepwise each time the step-out is detected.

Configuration Example for Step-out Countermeasure Control

Figure 2:
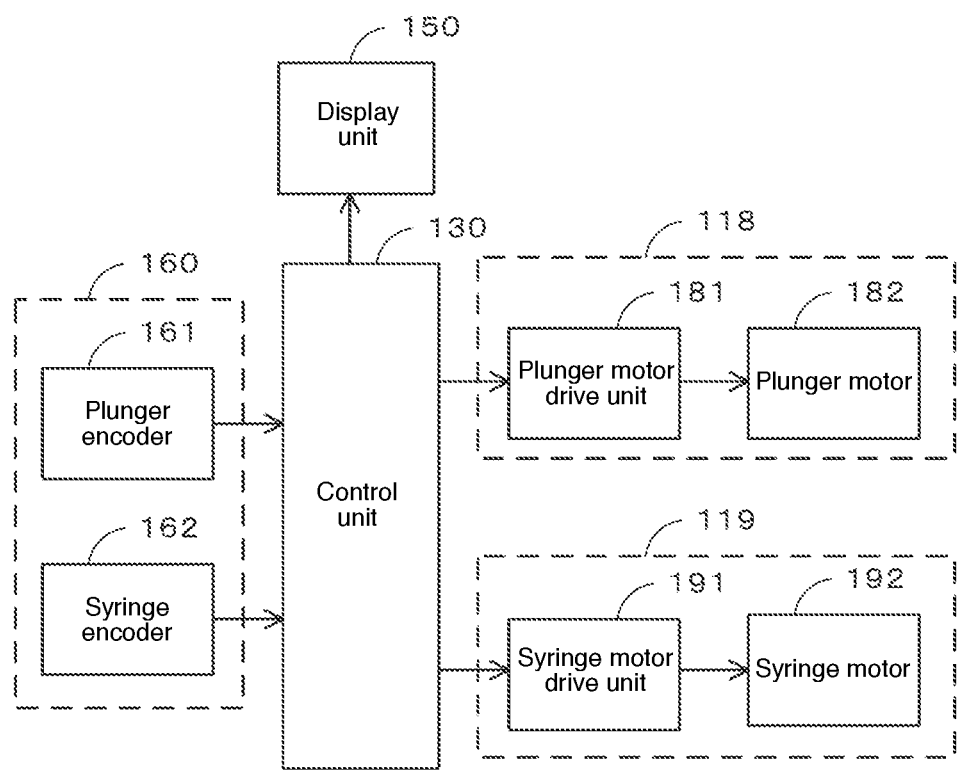
FIG. 2 is a block diagram illustrating a configuration of a control system related to step-out countermeasure control in the analysis device.

FIG. 2 is a block diagram showing the configuration of the control system related to the step-out countermeasure control in the analysis device 100. In FIG. 2, the configuration described in FIG. 1 is assigned by the same reference numeral. The plunger drive unit 118 is provided with a plunger motor 182 that is a stepping motor as a power source of the plunger 117, and a plunger motor drive unit 181 configured by a driving circuit for driving the plunger motor 182. The syringe drive unit 119 is provided with a syringe motor 192 configured by a stepping motor that is a power source of the syringe 115, and a syringe motor drive unit 191 configured by a driving circuit for driving the syringe motor 192.

The plunger motor drive unit 181 outputs a driving signal to the plunger motor 182 based on the motor control signal inputted from the control unit 130. The plunger motor 182 is driven and controlled based on the driving signal inputted from the plunger motor drive unit 181.

The syringe motor drive unit 191 outputs the driving signal to the syringe motor 192 based on the motor control signal inputted from the control unit 130. The syringe motor 192 is driven and controlled based on the driving signal inputted from the syringe motor drive unit 191.

A stepping motor, such as, e.g., the plunger motor 182 and the syringe motor 192, may cause step-out due to aging or the like. As a step-out detection unit 160 capable of detecting the occurrence of such step-out, an encoder capable of detecting whether or not the stepping motor is stepped out by detecting the rotation amount of the stepping motor is provided. The plunger encoder 161 and the syringe encoder 162 are included in the step-out detection unit 160 as such an encoder. The plunger encoder 161 can detect the step-out of the plunger motor 182 by detecting the rotation amount of the plunger motor 182. The syringe encoder 162 can detect the step-out of the syringe motor 192 by detecting the rotation amount of the syringe motor 192. An encoder detection signal is inputted from the plunger encoder 161 to the control unit 130 in response to the rotation of the plunger motor 182 detected by the plunger encoder 161. An encoder detection signal is inputted from the syringe encoder 162 to the control unit 130 in response to the rotation of the syringe motor 192 detected by the syringe encoder 162.

For example, the control unit 130 sets the set value (driving torque set value) of the driving torque stepwise each time the step-out is detected, as shown in FIG. 3 which will be described later. With this, a control signal is outputted to each motor such that the plunger motor 182 and the plunger motor drive unit 181 are driven by driving torque as close as possible to the minimum required torque that does not cause step-out.

The display unit 150 has a function of notifying various information, in addition to the above-described various information, in response to the occurrence of the step-out. The control unit 130 outputs an image control signal to the display unit 150 when step-out of each motor is detected by the step-out detection unit 160. The image control signal is a control signal for making the display unit 150 execute various notification displays related to the step-out based on the establishment of predetermined conditions.

Stepwise Setting Change Pattern Example of Driving Torque In Step-out Countermeasure Control FIG. 3 is a timing chart showing a stepwise setting change pattern example of the driving torque in the step-out countermeasure control. In FIG. 3, the vertical axis represents driving torque set values in a plurality of stages, i.e., a first stage to a fifth stage. The horizontal axis represents an elapsed time from the operation start of the analysis device 100. Hereinafter, with reference to FIG. 3, the stepwise setting change example of the driving torque in the step-out countermeasure control will be described.

The set values of the driving torque have a relation of a first stage<a second stage<a third stage<a fourth stage<a fifth stage. The set values of the driving torque are set such that the set value in the first stage is set as an initial set value, and the set value in the fifth stage is set as an upper limit set value (the upper limit of the stage of the driving torque set value). The change in the driving torque set value can be achieved by changing the driving current value of the stepping motor, such as, e.g., the plunger motor 182 and the syringe motor 192. There is a relation that the driving torque value of the stepping motor is in proportional to the driving current value. For the set value of each driving torque in the first stage to the fifth stage, a corresponding driving current is predetermined. The control unit 130 performs control to drive the stepping motor by the driving torque in each stage by changing the set value of the driving current according to the set value of the driving torque.

It is considered that the period until the step-out occurs differs depending on the individual differences of the analysis device 100, and the use mode, such as, e.g., the installation condition and the operation rate of the analysis device 100. In a typical use mode, it is considered that step-out occurs in a stepping motor each time a period of year unit elapses.

It is assumed that a stepping motor, such as, e.g., the plunger motor 182 and the syringe motor 192, is driven by a set value of driving torque in the first stage. In this case, when the step-out is detected based on the detection signal of the detection unit 160 in the stepping motor, the control unit 130 performs control to change the set value of the driving torque to the set value of the driving torque in the second stage. Then, it is assumed that the stepping motor is being driven by the set value of the driving torque in the second stage. In this case, when step-out is detected based on the detection signal of the detection unit 160 in the stepping motor, the control unit 130 performs control to change the set value of the driving torque to the set value of the driving torque in the third stage. Then, it is assumed that the stepping motor is being driven by the set value of the driving torque in the third stage. In this case, when step-out is detected based on the detection signal of the detection unit 160 in the stepping motor, the control unit 130 performs control to change the set value of the driving torque to the set value of the driving torque in the fourth stage. Then, it is assumed that the stepping motor is driven by the set value of the driving torque in the fourth stage. In this case, when step-out is detected based on the detection signal of the detection unit 160 in the stepping motor, the control unit 130 performs control to change the set value of the driving torque to the set value of the driving torque in the fifth stage.

As described above, in the step-out countermeasure control, each time the step-out of the stepping motor is detected, the set value of the driving torque of the stepping motor is increased stepwise. That is, the set value of the driving torque of the stepping motor is repeatedly increased a plurality of times between the initial set value and the upper limit set value.

Thus, in the analysis device 100, the step-out countermeasure control is performed for the stepping motor, such as, e.g., the plunger motor 182 and the syringe motor 192. That is, the step-out countermeasure control is executed based on the driving torque setting change pattern that performs the stepwise setting change of the set value of the driving torque each time the step-out is detected.

Driving Torque Set Value Table Example Used for Step-out Countermeasure Control

FIG. 4 is a diagram showing a driving torque set value table example used for the step-out countermeasure control in a tabular format. In FIG. 4, as an exemplary driving torque set value table used for the step-out countermeasure control, a data table in which the driving torque set value can be changed in a plurality of stages, such as, e.g., the first stage to the fifth stages, is shown in a tabular format. Such a driving torque set value table is stored in the ROM of the control unit 130. As the driving torque set value table, a driving torque set value table corresponding to the plunger motor 182 and a driving torque set value table corresponding to the syringe motor 192 are provided. Hereinafter, with reference to FIG. 4, the driving torque set value table example used in the step-out countermeasure control will be described below.

In FIG. 4, the correspondence relation between the driving torque set value stage, and the driving current set value, and the driving torque set value is shown. The initial set value of the driving torque set value is set to a first driving torque set value in the first stage. By driving the stepping motor at the first driving current set value, the driving of the stepping motor at the first driving torque set value can be achieved. In the second stage in which the driving torque set value is changed from the first stage, the driving of the stepping motor at the second drive torque set value is achieved by driving the stepping motor at the second driving current set value. In the third stage in which the driving torque set value is changed from the second stage, the driving of the stepping motor at the third drive torque set value is achieved by driving the stepping motor at the third driving current set value. In the fourth stage in which the driving torque set value is changed from the third stage, the driving of the stepping motor at the fourth drive torque set value is achieved by driving the stepping motor at the fourth driving current set value. In the fifth stage in which the driving torque set value is changed from the fourth stage, the driving of the stepping motor at the fifth drive torque set value is achieved by driving the stepping motor at the fifth driving current set value.

The first driving torque set value in the first stage, which is an initial set value, is set to a driving torque value obtained by adding a certain margin (allowance) to the minimum required driving torque that does not cause the step-out of the stepping motor during the initial period of the operation start of the analysis device 100. The second driving torque set value in the second stage is set to a driving torque value obtained by adding a certain margin (allowance) to the minimum required driving torque that does not cause the step-out of the stepping motor after the step-out of the stepping motor in an operating state at the first driving torque set value in the first stage. The third driving torque set value in the third stage is set to a driving torque value obtained by adding a certain margin (allowance) to the minimum required driving torque that does not cause the step-out of the stepping motor after the step-out of the stepping motor in an operating state at the second driving torque set value in the second stage. The fourth driving torque set value in the fourth stage is set to a driving torque value obtained by adding a certain margin (allowance) to the minimum required driving torque that does not cause the step-out of the stepping motor after the step-out of the stepping motor in an operating state at the third driving torque set value in the third stage. The fifth driving torque set value in the fifth stage is set to a driving torque value obtained by adding a certain margin (allowance) to the minimum required driving torque that does not cause the step-out of the stepping motor after the step-out of the stepping motor in an operating state at the fourth driving torque set value in the fourth stage.

In this way, the driving torque set value in each stage of the first stage to the fifth stage is set to a driving torque value obtained by adding a certain margin (allowance) to the minimum required driving torque that does not cause the step-out of the stepping motor in the operating state in each stage. Such a driving torque set value in each stage of the first stage to the fifth stage is set to the driving torque value as close as possible to the minimum required driving torque value that does not cause the step-out of the stepping motor in each stage.

The driving torque set value in each stage of the first stage to the fifth stage stages is realized by setting the driving current set value. That is, in the operating state in each stage, the driving current set value is set to be a driving torque value obtained by adding a certain margin (allowance) to the minimum required driving torque value that does not cause the step-out of the stepping motor. For example, the increment value of the driving current value in each stage in the first driving current set value to the fifth driving current set value is set to be constant. The driving torque of the stepping motor is controlled by the driving current. Therefore, in a case where the increment value of the driving current value in each stage in the first driving current set value to the fifth driving current set value is set to be constant, the control by the control unit 130 can be simplified.

In the case of executing the step-out countermeasure control for controlling the drive unit to increase the driving torque set value of the stepping motor stepwise in a plurality of stages each time the step-out of the stepping motor is detected, the more the increment value of the driving torque set value in each stage, the longer the time until the next step-out occurs. But, the vibration and the noise of the motor increase. As the load of the mechanical unit driven by the stepping motor becomes larger, the minimum required driving torque value that does not cause the step-out of the stepping motor in the operating state in each stage becomes larger. Therefore, it is desirable to set the number of stages of the set value of the driving torque and the increment amount of the driving torque set value in each stage when executing the step-out countermeasure control to an optimum level in view of the above-described circumstances.

In the step-out countermeasure control, the set value of the driving torque of the stepping motor is increased a plurality of times between the initial set value and the upper limit set value each time the step-out of the stepping motor is detected. Therefore, it is possible to reduce the single increment range of the driving torque set value to be increased when the step-out of the stepping motor is detected. Further, in the step-out countermeasure control, the control to increase the driving torque set value stepwise is executed by increasing the set value of the driving current of the stepping motor stepwise. Therefore, as compared with the conventional technique in which the driving torque setting value is increased in response to the decrease in the rotational speed of the stepping motor, it becomes possible to suppress vibration and noise generated from the stepping motor in response to the increase in the driving torque set value.

Example of Step-Out Countermeasure Control Processing

Figure 5:
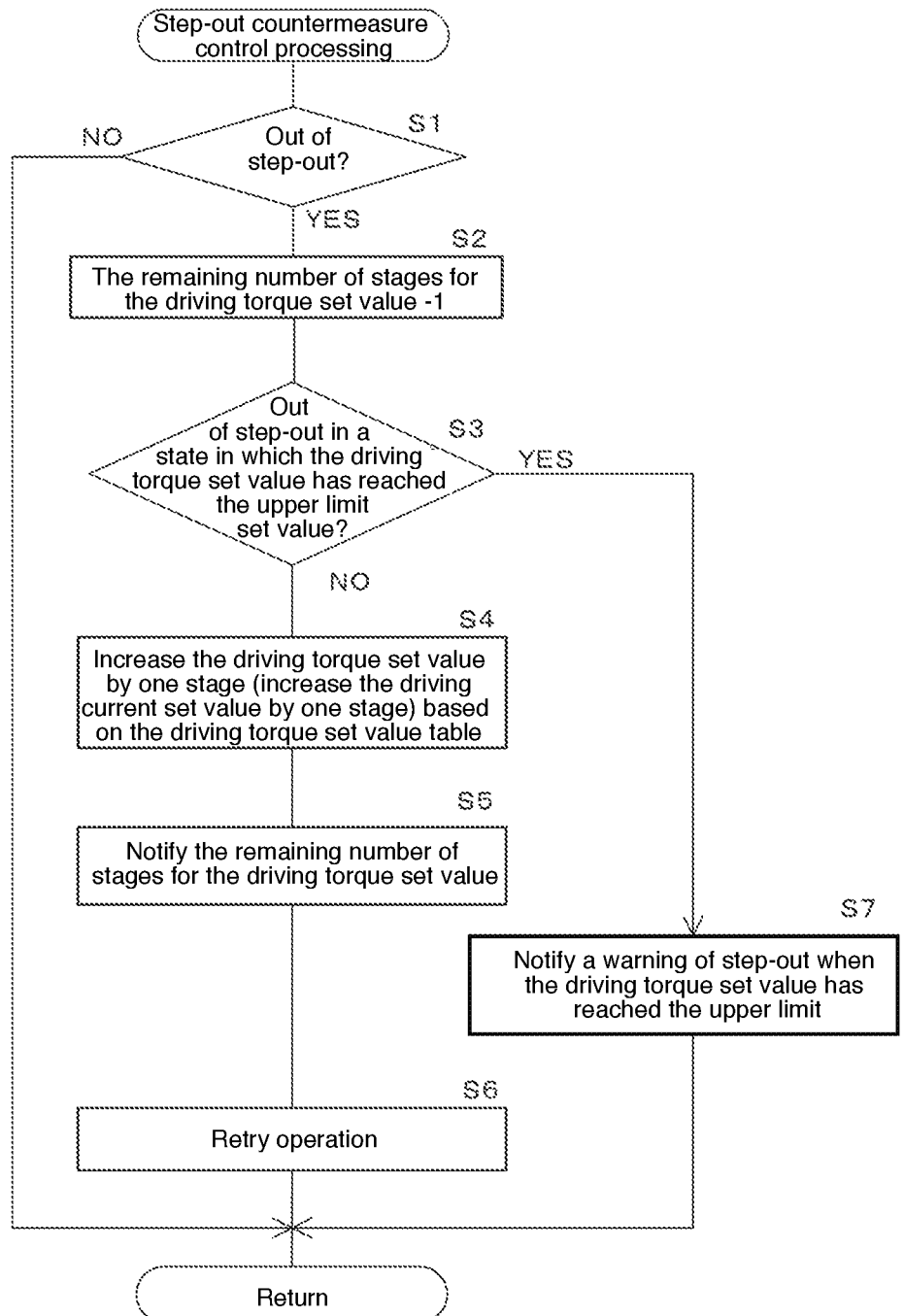
FIG. 5 is a flowchart of step-out countermeasure control processing used for the step-out countermeasure control.

FIG. 5 is a flowchart of the step-out countermeasure control processing for use in the step-out countermeasure control. The step-out countermeasure control processing program is stored in the ROM of the control unit 130. The CPU of the control unit 130 reads out the program to the RAM and execute the program. The step-out countermeasure control processing of FIG. 5 is performed when a stepping motor, such as, e.g., the plunger motor 182 and the syringe motor 192, is being driven. When the step-out is detected in the stepping motor which is being driven, the driving torque set value of the stepping motor is changed to perform a retry operation. This enables the stepping motor to return from the step-out state to the normal state (non-step-out state) without stopping the analysis device 100.

Referring to FIG. 5, the contents of the step-out countermeasure control processing executed by the control unit 130 will be described below. In Step S (hereinafter abbreviated as "S") 1, it is determined whether or not it has been detected that the step-out has occurred in the stepping motor to be controlled, based on the encoder detection signal inputted from the step-out detection unit 160. Specifically, in S1, it is confirmed whether or not the stepping motor has rotated by the set rotation amount based on the encoder detection signal. When it is confirmed that only the stepping motor has rotated by the set rotation amount, it is determined that the step-out has not occurred. When it is confirmed that the stepping motor has not rotated by only the set rotation amount, it is determined that the step-out has occurred. In S1, when it is determined that it is not detected that the step-out has occurred, the processing returns.

In S1, when it is determined that the step-out has occurred, the data of the remaining number of stages for the driving torque set value is subtracted by "1" in S2. The data of the remaining number of stages for the driving torque set value is the remaining number of stages (remaining stage number) for the driving torque set value that can be changed until the final stage (upper limit set value) in a case where the driving torque set value that can be changed in a plurality of stages as shown in FIG. 3 and FIG. 4 is changed. For example, as shown in FIG. 4, the case in which the driving torque set value from the first stage to the fifth stage can be changed is as follows. That is, the "the remaining number of stages for the driving torque set value" when step-out is detected during the driving of the stepping motor at the driving torque set value in the first stage and the driving torque set value is changed to the driving torque set value in the second stage is "3." The data of "the remaining number of stages for the driving torque set value" is stored and updated in the RAM of the control unit 130. The data of "the remaining number of stages for the driving torque set value" is set such that the initial set value is set to a value of "the number of the final stage—the number of the initial stage" (for example, "4" in FIG. 4), and is then subtracted by "1" and updated in S2 each time the step-out is detected once.

Next, in S3, it is determined whether or not the current state is in a state in which the step-out is detected in S1 in a state in which the stage of the driving torque set value has reached the the stage (final stage) of the upper limit set value stage, based on the data of the remaining number of stages for the driving torque set value obtained by the subtraction in S2. For example, in the case of using the driving torque set value table of FIG. 4, in S4, when the remaining number of stages for the driving torque set value obtained by the subtraction in S2 is "−1," it is determined that it corresponds to the state in which "the step-out is detected in a state in which the stage of the driving torque set value stage has reached the stage of the upper limit set value." On the other hand, when the remaining number of stages for the driving torque set value obtained by the subtraction in S2 is the number larger than "−1" (equal to or greater than "0"), it is determined that it does not correspond to the state in which "the step-out is detected in a state in which the driving torque set value stage has reached the stage of the upper limit set value."

In a case where it is determined in S3 that it does not correspond to "the state in which the step-out is detected in a state in which the stage of the driving torque set value has reached the stage of the upper limit set value", the processing is performed as follows. That is, in S4, the set value of the driving torque of the stepping motor in which the step-out has occurred is increased by one stage based on the driving torque set value table as shown in FIG. 4. With this, the set value of the driving torque is increased stepwise (which is realized by increasing the driving current set value by one stage as shown in FIG. 4). With this, for the stepping motor in which step-out has occurred, the control to increase the driving torque by one stage by increasing the driving current supplied from the motor drive unit by one stage. When the driving torque set value is changed, the stepping motor returns from the step-out state to the normal state.

After S4, the processing proceeds to S5, and the display unit 150 is made to display an image capable of identifying the current remaining number of stages for the driving torque set value, based on the data of the remaining number of stages for the driving torque set value that has been subtracted and updated in S2. In this way, the specific notification is executed in which the remaining number of times (the remaining number of stages for the driving torque set value) capable of increasing the set value of the driving torque is notified. For example, the remaining number of stages for the driving torque set value is notified by an image of characters and numbers, such as, e.g., "The remaining number of stages for the driving torque set value: [3]." By notifying the remaining number of stages for the driving torque set value, the administrator of the analysis device 100 can grasp how long the analysis device 100 can be continuously operated.

After S5, the processing proceeds to S6. By executing the driving of the stepping motor whose driving torque set value has been changed in S4 again, the processing for executing a retry operation of causing the plunger 117 or the syringe 115 in which the step-out of the stepping motor has occurred to be executed again is performed. The processing is then returned.

On the other hand, in a case where t is determined in S3 that it corresponds to "the state in which the step-out is detected in a state in which "the stage of the driving torque set value has reached the stage of the upper limit set value," the processing proceeds to S7. In S7, an image (for example, a character image such as "Step-out has occurred at the driving torque setting upper limit!" or the like) for warning that the step-out has been detected in a state in which the driving torque set value has reached the upper limit set value is displayed. In this way, a prescribed notification (notification of warning of step-out at the driving torque setting upper limit) for warning that the step-out has occurred at the driving torque setting upper limit is executed. Thereafter, the processing is returned. As described above, with the notification of the step-out warding at the driving torque setting upper limit, it becomes possible for the administrator of the analysis device 100 to recognize that it has becomes the state in which the analysis device 100 is unable to operate normally due to the step-out of the stepping motor.

The step-out countermeasure control processing described above is repeatedly executed when a stepping motor, such as, e.g., the plunger motor 182 and the syringe motor 192, is being driven. With this, for such a stepping motor, each time the step-out is detected, the setting change to increase the driving torque set value stepwise is executed to return the stepping motor from the step-out state to the normal state (non-step-out state).

Such a step-out countermeasure control processing may be executed by separately providing the step-out countermeasure control processing corresponding to the plunger motor 182 and the step-out countermeasure control processing corresponding to the syringe motor 192. Further, the same step-out countermeasure control processing may be sequentially executed for each plunger motor 182 and syringe motor 192.

Effects of Embodiment (1) In the analysis device 100 according to this embodiment, as shown in the step-out countermeasure processing of FIG. 5, each time it is detected that the step-out has occurred in a stepping motor, such as, e.g., the plunger motor 182 and the syringe motor 192, the following processing is executed. That is, the setting change is executed in which the driving torque set value is increased stepwise to return the stepping motor from the step-out state to the non-step-out state. As a result, in the analysis device 100, when the step-out has occurred in the stepping motor, the driving torque can be increased as close as possible to the minimum required driving torque for returning from the step-out state to the non-step-out state. Therefore, vibration and noise generated from the stepping motor can be suppressed. This in turn can reduce vibration and noise generated from the stepping motor due to the countermeasure for the step-out of the stepping motor.

(2) In the analysis device 100, as shown in FIG. 3, the set value of the driving torque of the stepping motor is increased stepwise each time the step-out of the stepping motor, such as, e.g., the plunger motor 182 and the syringe motor 192, is detected based on the detection signal of the step-out detection unit 160. The stepwise increase in the set value is repeatedly performed a plurality of times between the initial set value and the upper limit set value. In the analysis device 100, each time the step-out of the stepping motor is detected, the set value of the driving torque of the stepping motor is increased a plurality of times between the initial set value and the upper limit set value. Therefore, it is possible to reduce the single increment range of the set value of the driving torque when the step-out of the stepping motor is detected.

(3) In the analysis device 100, as shown in S7 of FIG. 5, the prescribed notification is executed to warn that the step-out has occurred in response to the detection of the step-out of the stepping motor in a state in which the set value of the driving torque has reached the upper limit set value. With this, the administrator of the analysis device 100 can recognize that the analysis device 100 has become a state in which it cannot be normally operated due to the step-out of the stepping motor.

(4) In the analysis device 100, as shown in S5 of FIG. 5, each time the step-out of the stepping motor is detected, the specific notification to notify the remaining number of stages for the driving torque set value is executed. This allows the administrator of the analysis device 100 to grasp how long the analysis device 100 can be continuously operated.

(5) In the analysis device 100, as shown in FIG. 3 to FIG. 5, the control unit 130 performs the control to increase the driving torque set value stepwise by increasing the driving current set value of the stepping motor stepwise. With this, as compared with the conventional technique in which the driving torque set value is increased in response to the decrease in the rotational speed of the stepping motor, it becomes possible to suppress the vibration and the noise generated by the stepping motor in response to the increase in the driving torque.

Modifications of Embodiment (1) The analysis device to be subjected to the aforementioned step-out countermeasure control is not limited to the analysis device 100 using the gas chromatography as described above. The analysis device may be any other type of analysis device, such as, e.g., an analysis device using a liquid-chromatograph, as long as it is an analysis device equipped with a stepping motor for driving a mechanical unit for analyzing a sample. The analysis device in which the step-out countermeasure control is executed may be a device constituting a part of an analysis system, such as, e.g., an automated sample injection device. Further, the above-described step-out countermeasure control may be applied to a device used in various analysis devices, such as, an auto-sampler.

(2) The number of stages of the driving torque set value in the above-described step-out countermeasure control is not limited to the first stage to the fifth stage described with reference to FIG. 3, FIG. 4, etc., and may be, for example, other number of stages, such as a first stage to a third stage, and a first stage to tenth stage. That is, the driving torque set value in the step-out countermeasure control may be set to any number of stages as long as it is set to be increased in a plurality of stages between an initial set value and an upper limit set value.

(3) The driving torque set value of the plurality of stages in the step-out countermeasure control described above may be set such that the increment amount of the driving current set value in each state as described in FIG. 4 becomes constant. Alternatively, the driving current set value may be set such that the increment amount of the driving torque set value in each stage is constant. The reason is as follows. The characteristics of the stepping motor (the proportional relation between the driving current and the driving torque) change as the driving torque approaches the upper limit set value. Therefore, if the increment amount of the driving current set value is constant, the increment amount of the driving torque set value is not always constant. Further, if the increment amount of the driving torque set value is constant, the increment amount of the driving current set value is not always constant.

(4) The driving torque set values in the plurality of stages in the step-out countermeasure control described above may be different (driving torque set value increment range variable type) or the same (driving torque set value increment range fixed type) in the increment range of the driving torque in each stage. For example, the driving torque set value in the plurality of stages may be such that a constant driving torque value increases in each stage, or may be such that an increment range of the driving torque value increases each time the stage advances.

(5) The step-out countermeasure control of the stepping motor described above is not limited to the plunger and the syringe described above and can be executed for other various mechanical units equipped in various analysis devices as long as it is a mechanical unit driven by a stepping motor.

(6) In the step-out countermeasure control of the stepping motor described above, an example is shown in which the notification of the remaining number of stages for the driving torque set value in S5 of FIG. 5 and the notification of warning of step-out at the driving torque setting upper limit in S7 of FIG. 5 are executed in the display unit 150, i.e., in the same notification unit. However, the present invention is not limited to this, and these notifications may be executed by different notification units (different display units or the like).

(7) In the step-out countermeasure control of the stepping motor described above, the specific notification to notify the remaining number of stages for the driving torque set value in S5 of FIG. 5 may be performed by audio output other than an image of numbers and characters described above. Further, the specific notification may be performed in a notification mode in which light emission of a light emitter, such as, e.g., an LED, is combined with an image of characters along, an audio output alone, or the combination thereof. Further, the prescribed notification to notify the warning of step-out at the driving torque setting upper limit in S7 of FIG. 5 may be performed by audio output, other than the above-described image of characters. Alternatively, the notification may be performed in a notification mode in which light emission of a light emitter, such as, e.g., an LED, is combined with an image of characters alone, an audio output alone, or the combination thereof.

(8) The set value of the driving torque in each stage set by the step-out countermeasure control of the stepping motor described above is preferably set to the driving torque value obtained by adding a certain margin (allowance) to the minimum required driving torque that does not cause step-out of the stepping motor in each stage. However, the set value of the driving torque may be a minimum required driving torque that does not cause step-out of the stepping motor.

(9) In the step-out countermeasure control of the stepping motor described above, the remaining number of stages for the driving torque set value is notified each time the step-out is detected and the stage is increased by one stage as in S5 of FIG. 5. However, the notification of the remaining number of stages for the driving torque set value may be executed only in the stage in which the remaining number of stages for the driving torque set value has become "0", that is, in the stage in which the driving torque set value has become the upper limit set value (final stage). By configuring as described above, the user of the analysis device 100 can recognize that the analysis device 100 will become a state in which the analysis device 100 becomes a state in which it is unable to be normally operated in the near future due to the step-out of the stepping motor. With this configuration, the processing for notifying the remaining number of stages for the driving torque set value can be simplified. Further, the notification of the remaining number of stages for the driving torque set value may be executed from a predetermined stage in which the remaining number of stages for the driving torque set value has approached "0" (for example, a stage in which the remaining number of stages for the driving torque set value is "1") to a stage in which the remaining number of stages for the driving torque set value has become "0".

(10) In the step-out countermeasure control of the stepping motor described above, the remaining number of stages for the driving torque set value is notified each time the step-out is detected and the stage is increased by one stage as in S5 of FIG. 5. However, as long as at least the notification of warning of step-out at the driving torque setting upper limit in S7 of FIG. 5 is executed, it may be configured such that the notification of the remaining number of stages for the driving torque set value is not executed each time the step-out is detected and the stage is increased by one stage. With this configuration, it is possible to prevent the user of the analysis device 100 from feeling that the notification is troublesome.

(11) In the step-out countermeasure control of the stepping motor described above, a predetermined warning is notified when step-out has occurred in a condition in which it is the driving torque setting upper limit. However, the stage in which the remaining number of stages for the driving torque set values has become "0", that is, the stage in which the driving torque set value has become the upper limit set value (final stage), is a state in which the analysis device 100 will become unable to be operated normally when step-out is detected in the near future. Therefore, in a stage in which such a remaining number of stages for the driving torque set values has become "0", a predetermined warning may be notified, for example, by displaying an image of characters, such as, e.g., "The driving torque setting upper limit has reached, and the device will be stopped at the next motor step-out!"

(12) In the step-out detection unit 160, an example is shown in which a detector, such as, e.g., the plunger encoder 161 and the syringe encoder 162, for detecting the rotation amount of the stepping motor is used. However, the present invention is not limited thereto, and any other detector, such as, e.g., a photo interrupter, may be provided for detecting the occurrence of step-out. As described above, the step-out detection unit 160 may be any other detection means as long as it is a detection means that can detect whether or not the stepping motor is being operated normally.

(13) The analysis device 100 described above may be configured as an analysis system in which the automatic sample injection unit 110, the gas chromatograph unit 120, and the control unit 130, and the detection control unit 230 are configured as individual devices, and these devices are used in combination. In such a case, the control unit 130 and the detection control unit 230 may be configured by a personal computer. For example, the control unit 130 and the detection control unit 230 may be realized by a CPU in the personal computer executing programs stored in the storage device. In such a case, the display unit 150 may be configured by a display unit of the personal computer, the input unit 140 may be configured by an input unit of the personal computer, and the storage unit 135 may be configured by a storage unit of the personal computer.

Appendix

The analysis device according to the present disclosure has the following features.

(1) An analysis device includes:
- a stepping motor (the plunger motor 182, the syringe motor 192, etc.) configured to drive a mechanical unit for analyzing a sample;
- a drive unit (the plunger motor drive unit 181, the syringe motor drive unit 191, etc.) configured to drive the stepping motor by set driving torque;
- a control unit (the control unit 130, etc.) configured to control the drive unit, and
- a detection unit (the step-out detection unit 160) capable of detecting step-out of the stepping motor,
- wherein the control unit controls the drive unit such that a set value of the driving torque of the stepping motor increases stepwise each time the step-out of the stepping motor is detected by the detection unit (see FIG. 3, FIG. 4, S4 of FIG. 5, etc.).

(2) The control unit increases the set value of the driving torque of the stepping motor stepwise by repeatedly increasing the set value a plurality of times between an initial set value and an upper limit set value, each time the step-out of the stepping motor is detected by the detection unit (see FIG. 3, FIG. 4, etc.).

(3) The analysis device further includes:
- a prescribed notification unit (the display unit 150, etc.),
- wherein the control unit makes the prescribed notification unit execute the prescribed notification in response to a detection of the step-out of the stepping motor by the detection unit in a state in which the set value of the driving torque of the stepping motor has reached an upper limit set value (S7 of FIG. 5).

(4) The analysis device further includes:
- a specific notification unit (the display unit 150, etc.),
- wherein the control unit makes the specific notification unit notify a remaining number of times to increase the set value of the driving torque, each time the step-out of the stepping motor is detected by the detection unit (S5 of FIG. 5).

(5) The control unit performs control to increase the set value of the driving torque of the stepping motor stepwise by increasing a set value of a driving current stepwise (see FIG. 3, FIG. 4, etc.).

The embodiments disclosed herein are to be considered in all respects as illustrative and not restrictive. The scope of the present invention is indicated by the appended claims rather than by the foregoing descriptions and is intended to include all modifications within the meanings and ranges equivalent to the claims.

DESCRIPTION OF SYMBOLS

182: Plunger motor
192: Syringe motor
181: Plunger motor drive unit
191: Syringe motor drive unit
130: Control unit
160: Step-out detection unit
150: Display unit

The invention claimed is:

1. An analysis device comprising:
a stepping motor configured to drive a mechanical unit for analyzing a sample;
a drive unit configured to drive the stepping motor by set driving torque;
a control unit configured to control the drive unit;
a detection unit capable of detecting step-out of the stepping motor; and
a specific notification unit,
wherein the control unit is configured to:
control the drive unit such that a set value of the driving torque of the stepping motor increases stepwise each time the step-out of the stepping motor is detected by the detection unit; and
make the specific notification unit notify a remaining number of times the set value of the driving torque of the stepping motor can be increased each time the step-out of the stepping motor is detected by the detection unit.

2. The analysis device as recited in claim 1, wherein the control unit is configured to increase the set value of the driving torque of the stepping motor stepwise by repeatedly increasing the set value a plurality of times between an initial set value and an upper limit set value each time the step-out of the stepping motor is detected by the detection unit.

3. The analysis device as recited in claim 1, further comprising:
a prescribed notification unit,
wherein the control unit is configured to make the prescribed notification unit execute a prescribed notification in response to a detection of the step-out of the stepping motor by the detection unit in a state in which the set value of the driving torque of the stepping motor has reached an upper limit set value.

4. The analysis device as recited in claim 1, wherein the control unit is configured to increase the set value of the driving torque of the stepping motor stepwise by increasing a set value of a driving current stepwise.

5. The analysis device as recited in claim 1, wherein the remaining number of times the set value of the driving torque of the stepping motor can be increased comprises a remaining number of stages for the set value of the driving torque.

6. The analysis device as recited in claim 5, wherein the remaining number of stages for the set value of the driving torque has been decremented each time the step-out of the stepping motor is detected by the detection unit.

7. The analysis device as recited in claim 5, wherein the set value of the driving torque is a multiple of a current stage number, and wherein the remaining number of stages is equal to a maximum stage number minus the current stage number.

* * * * *